United States Patent
Bornemann et al.

(10) Patent No.: US 8,138,107 B2
(45) Date of Patent: *Mar. 20, 2012

(54) LIGHTWEIGHT SPUN-BONDED NON-WOVEN WITH PARTICULAR MECHANICAL PROPERTIES

(75) Inventors: Steffen Bornemann, Jessnitz (DE); Markus Haberer, Osnabruck (DE); Stefanie Streich, Edemissen (DE); Dag Fohlin, Norrkoping (SE)

(73) Assignee: Fiberweb Corovin GmbH, Peine (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/403,863

(22) Filed: Mar. 13, 2009

(65) Prior Publication Data

US 2009/0233073 A1    Sep. 17, 2009

Related U.S. Application Data

(63) Continuation of application No. PCT/EP2007/008182, filed on Sep. 20, 2007.

(30) Foreign Application Priority Data

Sep. 21, 2006   (DE) ................. 10 2006 044 496

(51) Int. Cl.
*D04H 3/16* (2006.01)
*D04H 1/00* (2006.01)
*D04H 13/00* (2006.01)

(52) U.S. Cl. ........ 442/401; 442/340; 442/351; 428/218; 428/219; 428/220

(58) Field of Classification Search .......... 428/218–220; 442/401, 340, 351

See application file for complete search history.

(56) References Cited

U.S. PATENT DOCUMENTS

| 6,537,660 B2 * | 3/2003 | Katayama et al. ............ 428/364 |
| 2006/0014464 A1 * | 1/2006 | Noelle et al. ................... 442/401 |
| 2006/0084346 A1 | 4/2006 | Rollin | |

FOREIGN PATENT DOCUMENTS

| EP | 1 657 334 A | 5/2006 |
| WO | WO 94/28219 A | 12/1994 |
| WO | WO 00/44411 | 8/2000 |
| WO | WO 02/16681 A | 2/2002 |
| WO | WO 2007/124866 A | 11/2007 |

OTHER PUBLICATIONS

International Search Report mailed May 21, 2008 for PCT/EP2007/008182 (Filed Mar. 27, 2008).
International Preliminary Report on Patentability and Written Opinion for PCT/EP2007/008182, Filed Sep. 20, 2007.

\* cited by examiner

*Primary Examiner* — Norca L Torres Velazquez
(74) *Attorney, Agent, or Firm* — Alston & Bird LLP

(57) ABSTRACT

Disclosed is a spunbonded non-woven made of polyolefin filaments having a titer <1.6 dtex, the spunbonded non-woven having a surface weight $\leq 20$ g/m$^2$, a density $\geq 0.06$ g/cm$^3$, a maximum tensile force of between 9.5 and 62 N in the direction of the machine and of between 4.5 and 35 N perpendicular to the direction of the machine.

19 Claims, 4 Drawing Sheets

Sample 10 (7 g/m2, ZN-PP, 1.8 dtex @ 5,000) 10X

Sample 24 (7 g/m2, m-PP, 1.1 dtex @ 7,000) 10X

Sample 10 (7 g/m2, ZN-PP, 1.8 dtex @ 5,000) 10X

Sample 24 (7 g/m2, m-PP, 1.1 dtex @ 7,000) 10X

LIGHTWEIGHT SPUN-BONDED NON-WOVEN WITH PARTICULAR MECHANICAL PROPERTIES

CROSS REFERENCE TO RELATED APPLICATION

This application is a Continuation Application of International Application No. PCT/EP2007/008182, filed Mar. 27, 2008, which claims priority from German patent Application No. 10 2006 044 496.5 filed Sep. 21, 2006.

FIELD AND BACKGROUND OF THE INVENTION

The invention concerns a spun-bonded non-woven from polyolefin filaments with a filament titer <1.6 dtex. The spun-bonded non-woven is characterized by special mechanical properties.

The invention also concerns production of a laminate, using the spun-bonded non-woven according to the invention, as well as the use of the spun-bonded non-woven and use of the laminate produced with the spun-bonded non-woven.

Non-wovens are textile fabrics that can be produced in different ways. In addition to wet non-woven production and dry non-woven production, a distinction is made between melt spinning and melt blowing (melt-blown technology). The two technologies melt spinning and melt blowing have the advantage that the plastic granulate can be converted directly to the finished fabric by means of a corresponding installation. The comparatively high productivity of these installations during non-woven production is based on this.

In melt spinning, polymer granulates are melted in an extruder, forced through the openings, so-called spinnerets, of a spinning device and pneumatically or mechanically stretched after cooling. The ultimate strength of the filaments is established by the stretching process. The filaments, loosely laid after stretching on a moving laying belt, are chemically or thermally compacted to so-called bonding points in the area of the intersection points in contact. The softness of the non-woven so formed then diminishes with increasing compaction, during which its bending rigidity increases. Several identical or different overlapping spun-bonded layers can be compacted thermally, for example, by calandering, into a composite material (laminate).

During melt blowing, the productivity is lower than in melt spinning. An additional factor is that non-wovens produced by melt blowing have lower mechanical loadability than those produced by melt spinning. However, the non-wovens produced by melt blowing are characterized by very good barrier properties.

The objective of low-cost non-woven production is therefore replacement (or in the case of production of a laminate, reduction) of non-wovens produced by melt blowing by non-wovens that were ideally produced completely by melt spinning.

The properties of a spun-bonded non-woven are comprehensively described by the basis weight and density, as well as the mechanical properties, like maximum tensile force and maximum tensile elongation, and also the barrier properties, for example, water-tightness and air permeability.

The basis weight of a spun-bonded non-woven states its weight as a function of surface in $g/m^2$, in which the density of a spun-bonded non-woven corresponds to the ratio of basis weight and thickness of the spun-bonded non-woven. The reduction in basis weight of the spun-bonded non-woven can therefore be achieved either by reducing the spun-bonded non-woven density or reducing the spun-bonded non-woven thickness. In the normal case and when all other production parameters are kept constant, however, both of these are at the expense of mechanical properties, and also at the expense of the barrier properties of the spun-bonded non-woven.

The reduction of basis weight, however, is a central parameter in product improvement, because it essentially co-determines the wear comfort of products produced from the non-woven. Thus, a continuous trend toward lighter weight spun-bonded non-wovens can be seen in baby diapers, incontinence products and in products for feminine hygiene. On the other hand, however, air permeability diminishes with increasing non-woven thickness. But it is precisely these products that simultaneously require a guarantee of mechanical properties and barrier properties even with reduced basis weight. Basis weight, mechanical properties and barrier properties of the spun-bonded non-woven, however, depend on different parameters. A critical parameter that determines all the mentioned quantities is filament titer. The filament titer of a yarn or filament is stated as weight referred to length and describes its fineness. A high yarn fineness then means a smaller weight/length ratio. The yarn fineness is measured in tex, in which 1 tex is 1 gram per 1000 m, and a decitex (dtex) corresponds to 1 gram per 10,000 m.

Lower spun-bonded non-woven thicknesses are accessible, in principle, by using filaments with a lower filament titer, since finer filaments, when total throughput remains the same with unaltered speed of the conveyor belt during laying for non-woven formation, produce a non-woven layer of lower thickness with generally higher density, because of their smaller diameter.

When ordinary melt spinning technologies are used (U.S. Pat. No. 3,692,618, U.S. Pat. No. 5,032,329, U.S. Pat. No. 5,814,349, WO03038174 or WO02063087), finer filaments are produced by the fact that the polymer throughput (in grams of polymer per minute and hole) is reduced. This approach, however, is connected with a reduction in total installation throughput and is therefore undesired with respect to productivity. On the other hand, an increase in total throughput, when the other production parameters are kept constant, generally leads to thickening of the filaments and therefore to an increase in filament titer. An increase in filament titer, however, is not desired with respect to the objective of the present invention, which consists of producing a lightweight spun-bonded non-woven.

If, according to DE 10360845 A1, a spinning device with a spinning plate, which has a spinning device with a significantly increased number of nozzle openings per meter of spinning plate, is used to produce the filaments forming the lightweight spun-bonded non-woven, the polymer throughput in grams per unit of time and per hole is reduced, but the total throughput overall remains unchanged. At the same time, finer filaments are obtained, which permit the production of lighter-weight spun-bonded non-wovens.

A general problem of the spun-bonded non-wovens with lower weight known from the prior art, as already mentioned, is the lower mechanical stability. Such spun-bonded non-wovens can be easily torn, especially across the machine direction, and have limited dimensional stability. In the case of WO99/32699, which discloses a spun-bonded non-woven with a basis weight of about 13.6 $g/m^2$, this drawback is overcome with additional expense by reinforced bonding and a special pattern of the engraving rolls during thermal bonding.

Multilayer composite non-wovens (laminates) are also known from the prior art, whose outer layers consist of melt-spun spun-bonded non-woven layers, whereas at least one of the inner layers consists of very fine fibers, preferably produced by melt blowing. The low mechanical loadability of the layers produced by melt blowing makes the outer spun-bonded non-woven layers produced by melt spinning absolutely essential, in order to give the composite non-woven good mechanical loadability overall. Production of spun-bonded non-wovens with the best possible combination of barrier properties and mechanical properties has therefore only been guaranteed thus far by producing such laminates.

Spun-bonded non-wovens that are produced only by melt spinning are also known from the prior art, in which filaments with low filament titer are used. Thus, U.S. Pat. No. 5,885,909 discloses a non-woven made of polyolefin, constructed from fibers with a filament titer of only 0.33 dtex, which is characterized by improved barrier properties and breathing properties. The basis weight, however, is comparatively high at $\leqq 44.1$ g/m$^2$ with a non-woven thickness of 0.33 mm and a density of 0.1336 g/m$^3$.

An alternative method for production of lighter-weight spun-bonded non-wovens from olefin polymers is described in US 2004/0070101. The filaments produced by extrusion have an "island-in-the-sea" structure, in which the sea polymer has different solution properties than the island polymer and is removed after non-woven production by dissolving it out from the non-woven.

SUMMARY OF THE INVENTION

Against this background, the task of the invention consists of producing lightweight spun-bonded non-wovens produced by melt spinning with improved mechanical properties. The improvement in mechanical properties should also have a positive effect on the barrier properties. In addition, production of the spun-bonded non-woven should occur to guarantee productivity, without reducing total throughput.

The task of the invention also consists of providing a lightweight laminate, in comparison with other composite non-wovens (laminates), with improved mechanical and, at the same time, improved barrier properties.

To solve the task, polyolefin filament with a filament titer of <1.6 dtex is used, which during use of the melt spinning technology produces a spun-bonded non-woven, characterized by a basis weight of $\leqq 20$ g/m$^2$, and
a density of $\geqq 0.06$ g/cm$^3$, as well as
a maximum tensile force
from 10 to 62 N in the machine direction, and
from 5 to 35 N across the machine direction.

The key idea of the invention is initially based on the general finding that the mechanical properties of a non-woven depend mostly on filament titer, i.e., on the fineness of the employed filaments. A larger number of intersection points are formed between filaments with greater fineness (i.e., lower filament titer) after filament laying, provided the other parameters of non-woven production are essentially unchanged. Because of this, after chemical or thermal compaction of the non-woven, a larger number of binding sites are present. For this reason, the mechanical properties are improved in non-wovens having filaments with lower filament titer. The principle that finer filaments permit the formation of non-wovens with constantly improving mechanical properties, however, does not apply without restriction.

The inventors of the non-woven according to the invention recognized that precisely filaments with a filament titer of at most 1.6 dtex, especially in the range from 1.6 dtex to 1.0 dtex, permit the production of non-wovens whose basis weights are only 4 to 20 g/m$^2$, especially 4.0 to 12 g/m$^2$, and whose mechanical properties, at the same time, represent an optimum. The basis weight of a non-woven also increases because of increasing non-woven density with increasing fineness of the filaments, and there appears to be a window with respect to filament titer, in which the mechanical properties and the barrier properties improve disproportionately in comparison with basis weight.

The spun-bonded non-woven according to the invention is lightweight and, at the same time, has improved mechanical properties. In addition, despite its light weight, the barrier properties of the spun-bonded non-woven are also improved. "Lightweight" in the context of the invention means that the non-woven has a basis weight from 4 to 20 g/m$^2$. The special feature is that the non-wovens according to the invention are distinguished by mechanical properties that surpass ordinary non-wovens with comparable basis weights, despite the low basis weight.

Preferred variants of the invention will be further explained below.

In one variant, the spun-bonded non-woven has a density in the range of 0.06 to 0.084 g/cm$^3$. The upper density limit of 0.084 g/cm$^3$ concerns spun-bonded non-wovens, whose basis weight corresponds to the proposed upper limit for basis weight of about 20 g/m$^2$. The lower limit for air permeability of this spun-bonded non-woven lies at 3,100 L/(m$^2$·s) and the upper limit at 8,400 L/(m$^2$·s). On the other hand, the water-tightness is comparatively high; the water column can be up to 17 cm.

In a preferred variant, spun-bonded non-woven has a basis weight of maximum 12 g/m$^2$. In spun-bonded non-wovens with a basis weight in the range from 4 to 12 g/m$^2$, which are characterized as particularly homogeneous and lightweight, the density is maximum 0.073 g/cm$^3$. Since the density and air permeability are inversely proportional to each other, the lower limit of air permeability in spun-bonded non-wovens of this lighter-weight variant at 3,900 L/(m$^2$·s) is much higher. The water-tightness, with a water column of maximum 11 cm, is accordingly lower.

The upper limits for maximum tensile force are also much lower for spun-bonded non-wovens with basis weights in the range from 4 to 12 g/m$^2$ than for spun-bonded non-wovens with basis weights above 12 g/m$^2$. For spun-bonded non-wovens with basis weights with up to 20 g/m$^2$, the maximum tensile force is up to 62 N in the machine direction (MD) and up to 35 N across the machine direction (CD). For spun-bonded non-wovens with basis weights below 12 g/m$^2$, the maximum tensile force in the machine direction (MD), on the other hand, is maximum 32 N and across the machine direction (CD) maximum 20 N.

The maximum tensile elongation of a spun-bonded non-woven with up to 12 g/m$^2$ is up to 75% in the machine direction and up to 75% across the machine direction.

In a particularly preferred variant, the spun-bonded non-woven, whose density is 0.06 to 0.07 g/cm$^3$, has an air permeability between 3,900 and 8,300 L/m$^2$ s and a water column between 7 and 11 cm. The measured air permeability, because of the lower density of the spun-bonded non-woven, at 3,900 L/m$^2$ s as a lower limit, which lies much higher than the corresponding lower limit of air permeability for a spun-bonded non-woven with a density in the range of 0.06 to 0.084 g/cm$^3$. The values measured for the water column for the particularly preferred spun-bonded non-woven with the lower density, on the other hand, at 7 to 11 cm, lie in a narrower range than for the spun-bonded non-woven with a density in the range of 0.06 to 0.084 g/cm$^3$, for which a water column of 5 to 17 cm was measured.

A filament titer in the range of 1 to 1.3 dtex is particularly preferred. Filaments with this fineness permit production of spun-bonded non-wovens with a basis weight of less than 20 g/m$^2$.

To produce such filaments and therefore to produce the non-woven according to the invention, mostly polyolefin polymers and copolymer mixtures of the same are suitable. "Polymers" are macromolecular substances constructed from simple molecules (monomers) by polymerization, polycondensation or polyaddition. The class of polyolefins includes, among others, polyethylene (HDPE, LDPE, LLDPE, VLDPE; ULDPE, UHMW-PE), polypropylene (PP), poly(1-butene), polyisobutylene, poly(1-pentene), poly(4-methyl-1-pentene), polybutadiene, polyisoprene, as well as different olefin copolymers. In addition to these, heterophase blends are also included among the polyolefins. Thus, for example, polyolefins, especially polypropylene or polyethylene, graft or copolymers from polyolefins and α,β-unsaturated carboxylic acids or carboxylic acid anhydrides can be used.

The special suitability of polyolefins, however, does not rule out the use of polyester, polycarbonate, polysulfone, polyphenylene sulfide, polystyrene, polyamide or their mixtures.

The list of initial polymers is not final in either case. All other melt-spinnable polymers known to one skilled in the art are therefore not ruled out for use to produce the spun-bonded non-wovens.

Polyethylene and polypropylene, as well as olefinic copolymers and their mixtures, are particularly suited for production of the non-woven according to the invention. It goes without saying that the employed polyethylene can already be a mixture of different polyethylenes. The same applies for the employed polypropylene.

Polypropylene produced with metallocene catalysts (m-PP) has a more homogeneous distribution of molecular weight of the polymer units. This could explain why m-PP also still produces filaments with limited diameter at much increased throughput rates.

It is proposed that fillers or pigments be added to the polymer before extrusion. In principle, all fillers or pigments appropriate for the proposed use of the non-woven and known to one skilled in the art can be considered. For cost reasons alone, calcium carbonate is a particularly interesting filler. Titanium dioxide (TiO$_2$) is also a suitable filler and is proposed for production of the non-woven according to the invention.

The filaments in a particularly preferred variant can have a filler content of more than 5 wt. %. The average particle size of the filler (D50) is preferably 2 μm to 6 μm, in which the top cut (D98) of the particles is ≦10 μm.

Compaction of the spun-bonded non-woven can occur by all methods known to one skilled in the art. Compaction by chemical or thermal methods is preferred. During thermal compaction by calandering, the non-woven thickness is reduced in the area of the embossing points.

The non-woven thickness of the compacted spun-bonded non-woven lies in the range from 115 to 296 μm. The non-woven thickness for a spinning device with 5,000 holes/m (at a spinning beam width of 150 mm) then lies in the range of about 130 to about 296 μm. The non-woven thickness for a spinning device with 7,000 holes/m (and a spinning beam width of 150 mm) lies in the range of about 115 to about 266 μm. This shows that finer filaments have a tendency toward lower non-woven thicknesses.

It is proposed that the spun-bonded non-woven according to the invention forms a layer in a laminate consisting of at least two spun-bonded non-woven layers. The second or additional layers, depending on the use requirements, can have similar or very different properties than the spun-bonded non-woven according to the invention. Based merely on its lightweight characteristics, the non-woven according to the invention is suitable for a number of combinations. It is then also conceivable that one or more of the layers of laminate is produced by melt blowing.

Versatile application possibilities of the spun-bonded non-woven also lie within the scope of the invention. Production of one-layer fabrics, hygiene articles (diapers, sanitary napkins, cosmetic pads), dust-wipe and wipe-mop cloths, and for gas and liquid filters, bandages and compresses are proposed as the most important application possibilities for the non-wovens according to the invention. Production of insulation materials, acoustic non-wovens and microperforated roof insulation sheeting is also conceivable. Use as geofabrics is also conceivable. Geofabrics are used, for example, in strengthening dikes, in the field of roof vegetation, as a layer of landfill cover for separation of soil layers and refuse, or as an intermediate layer beneath the gravel bed of street pavement. Non-wovens can also be used with benefit in agriculture and gardening as a cover.

BRIEF DESCRIPTION OF THE DRAWINGS

The invention will be further explained below with reference to FIGS. 1 to 7 as examples. The mentioned examples, however, are intended to explain the invention in its details and not restrict it. In the figures.

EXPLANATION OF SYMBOLS IN THE FIGURES

Figure 1:
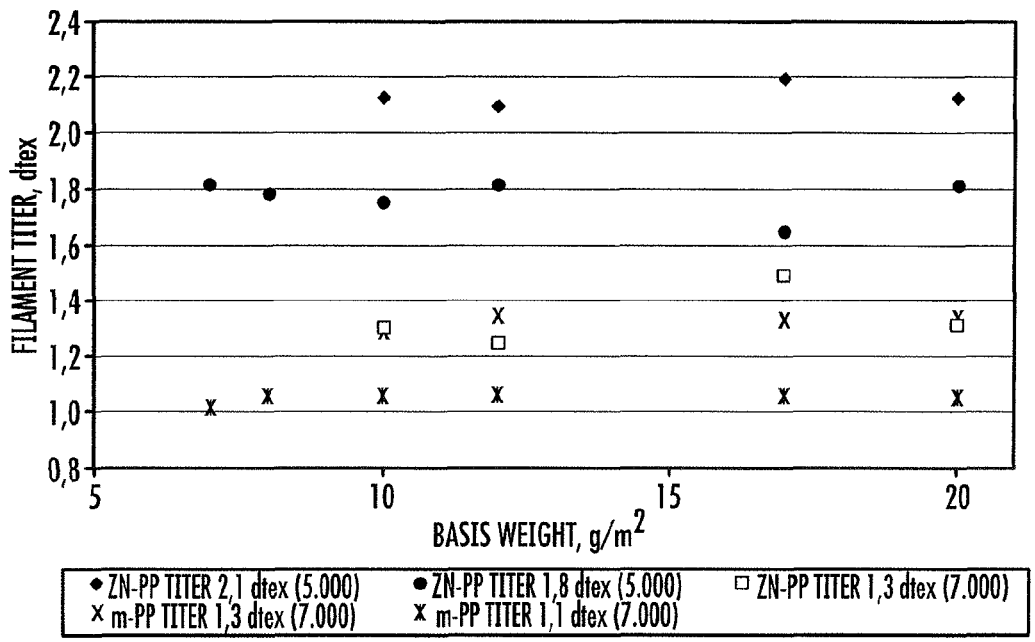
FIG. 1 shows the fiber fineness (filament titer), measured on spun-bonded non-wovens with different basis weights.

| | Presentation in the figures and tables | PP type | Nozzle opening density of spinning plate (per meter) | Filament fineness (dtex) |
|---|---|---|---|---|
| ◆ | ZN-PP titer 2.1 dtex (5,000) | Ziegler-Natta | 5,000 | 2.1 |
| ● | ZN-PP titer 1.8 dtex (5,000) | Natta | | 1.8 |
| □ | ZN-PP titer 1.3 dtex (7,000) | PP | | 1.3 |
| X | m-PP titer 1.3 dtex (7,000) | Metallocene | 7,000 | 1.3 |
| * | m-PP titer 1.1 dtex (7,000) | PP | | 1.1 |

The total number of openings per meter of spinning plate is given, in which the width of the spinning package surface provided with nozzle openings is 150 mm.

Example 1

Spun-bonded non-wovens with different basis weights were produced by melt spinning from a polypropylene prepared by Ziegler-Natta catalysis (Moplen HP560R; producer: Basell), subsequently called ZN-PP. The filament titer of the filaments forming the spun-bonded non-woven was set at 1.3 dtex, 1.8 dtex and 2.1 dtex.

The corresponding spun-bonded non-wovens are referred to as "sample 1" to "sample 14." The composition, process conditions and characteristic properties of the spun-bonded non-wovens produced from ZN-PP can be seen in Table 1.

Production of the spun-bonded non-wovens occurred on an ordinary "Reicofil 3" spun-bonded non-woven unit in the form, so that an ordinary spinning device with a spinning device with 5,000 nozzle openings per meter of spinning plate, a width of the spinning package surface provided with nozzle openings of 150 mm ("sample 1-10"), as well as an altered spinning device, comprising a spinning plate with an increased number of nozzle openings per surface of the spinning plate of 7,000 nozzle openings per meter of spinning plate, a width of the spinning package surface provided with nozzle openings of 150 mm ("sample 11-14") was used.

Example 2

For comparison, spun-bonded non-wovens with different basis weights were produced from a polypropylene produced by metallocene catalysis (Metocene HM562S; producer: Basell), subsequently called m-PP, with this altered spinning device with an increased number of nozzle openings per meter of spinning plate (7,000 nozzle openings per meter, width of the spinning package surface provided with openings 150 mm). The filament titer of the filaments forming the spun-bonded non-wovens was set at 1.3 dtex and 1.1 dtex.

The spun-bonded non-wovens so produced are referred to as "sample 15" to "sample 24." The composition, process conditions and characteristic properties of the spun-bonded non-wovens produced from m-PP, as well as a laminate from two spun-bonded non-woven layers, can be seen in Table 2.

The basis weights of the produced one-layer spun-bonded non-wovens are varied from 7 g/m² to 20 g/m².

Further addition of melt additives or pigments such as e.g. titanium dioxide did not occur here, although this lies within the scope of the invention.

Example 3

Production of the spun-bonded non-woven of "sample 25" occurred on a "Reicofil 3" spun-bonded non-woven installation in the form, so that a laminate was formed, in which two spun-bonded non-woven layers were combined in one process step. For this purpose, a configuration was chosen, in which to produce the first layer, (a) an ordinary spinning device (spinning plate with 5,000 nozzle openings per meter; width of the spinning package surface provided with nozzle openings 150 mm), and to produce the second spun-bonded woven layer, (b) an altered spinning device with increased number of nozzle openings per surface of the spinning plate (7,000 nozzle openings per meter of spinning plate; width of the spinning package surface provided with nozzle openings 150 mm) was used. The total installation throughput was chosen so that for both spinning devices (a) and (b), the same throughput was achieved. Based on the different configuration of the two spinning devices (a) and (b), this means that the throughput through the nozzle openings in spinning device (a) is about 0.63 $g_{polymer}$/hole*min (sample 25, 1$^{st}$ layer), and for spinning device (b) about 0.45 $g_{polymer}$/hole*min (sample 25, 2$^{nd}$ layer).

The process was run, so that in spinning device (a) ZN-PP (Moplen HP560R), and in spinning device (b) m-PP (Metocene HM562R), were processed. Since the throughput of the two spinning devices was chosen roughly equal, the basis weight of the two layers of laminate is also the same, i.e., a laminate was produced in which the basis weight of the individual layers is 5 g/m² each.

An explanation of the data shown in the figures follows.

FIG. 1 shows that spun-bonded non-wovens with different basis weights have very homogeneous filament fineness (filament titer).

Figure 2:
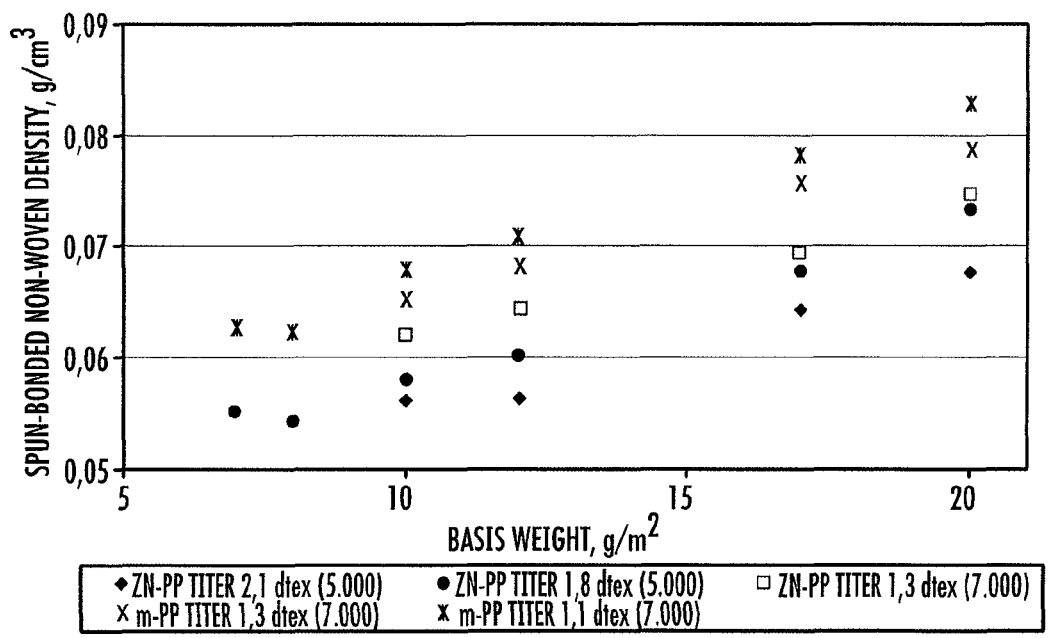
FIG. 2 shows the spun-bonded non-woven density for different spun-bonded non-wovens, plotted versus basis weight.

FIG. 2 shows that through the set process conditions, the spun-bonded non-woven density, calculated from the measured basis weight and spun-bonded non-woven thickness, can be significantly varied. The calculated spun-bonded non-woven density is shown as a function of basis weight of the spun-bonded non-woven. The filaments produced with a spinning device with 7,000 holes/m have a filament titer from 1 to 1.3 dtex. Especially during the use of this spinning device with an increased number of holes (7,000 nozzle openings per meter at a width of the spinning package surface provided with nozzle holes of 150 mm), it is found according to FIG. 2 that the spun-bonded non-woven density is significantly higher than during use of ordinary spinning devices (spinning plate with 5,000 nozzle openings per meter at a width of the spinning package surface provided with nozzle openings of 150 mm). The increase in non-woven density during use of a spinning device with a higher hole density is attributed to the higher fineness of the fibers.

Figure 3:
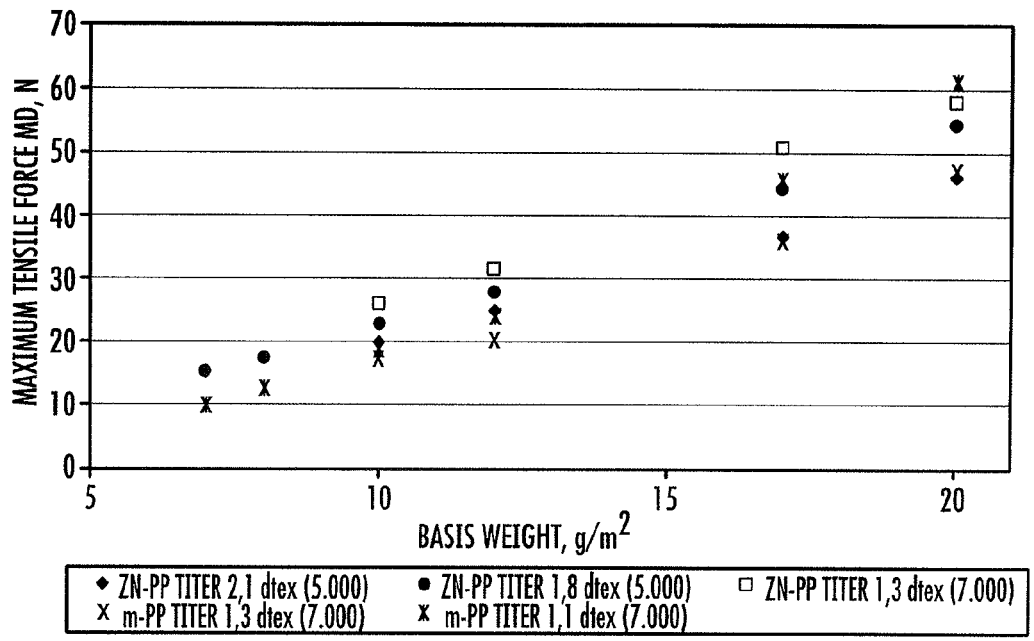
FIG. 3 and FIG. 4 show the maximum tensile force for spun-bonded non-wovens with different basis weights, shown for the machine (MD) and cross directions (CD).
Figure 4:
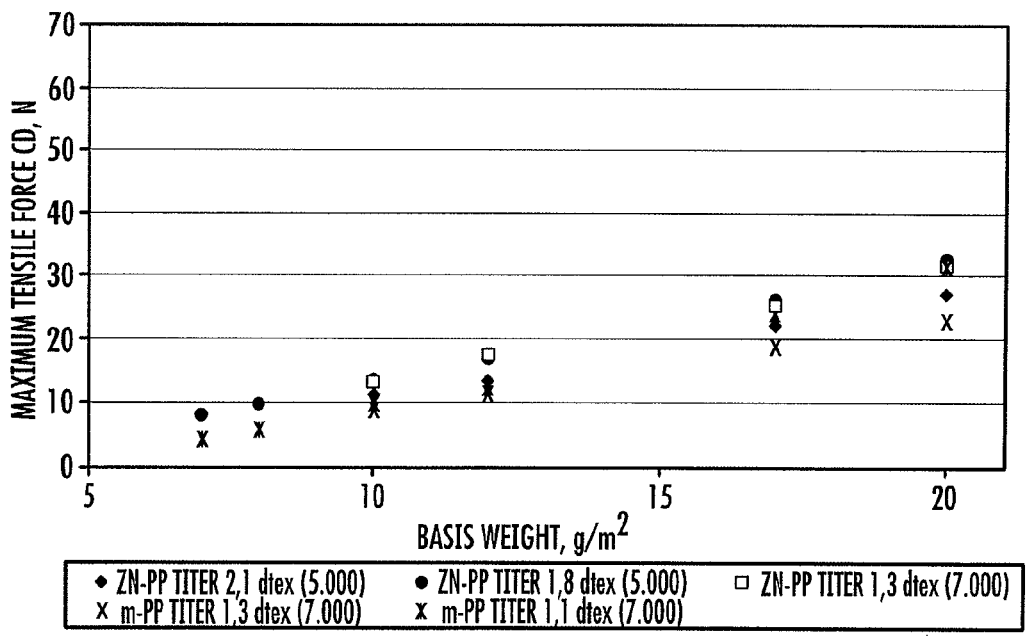

FIG. 3 and FIG. 4 show as examples for the mechanical properties of the spun-bonded non-wovens the maximum tensile force measured on spun-bonded non-wovens with different basis weight in the machine direction (MD, see FIG. 3) and across the machine direction (CD, see FIG. 4).

It is found that the maximum tensile force, regardless of the spinning device used during production, both in the machine and cross directions, lies in a narrow range. The somewhat lower maximum tensile force values for the spun-bonded non-wovens produced from m-PP in comparison with ZN-PP could be attributed to molecular differences in the two polymers. The melt flow index of the employed ZN-PP is stated as 25 dg/min and that of the employed m-PP 30 dg/min, which indicates a lower molecular weight for m-PP.

Figure 5:
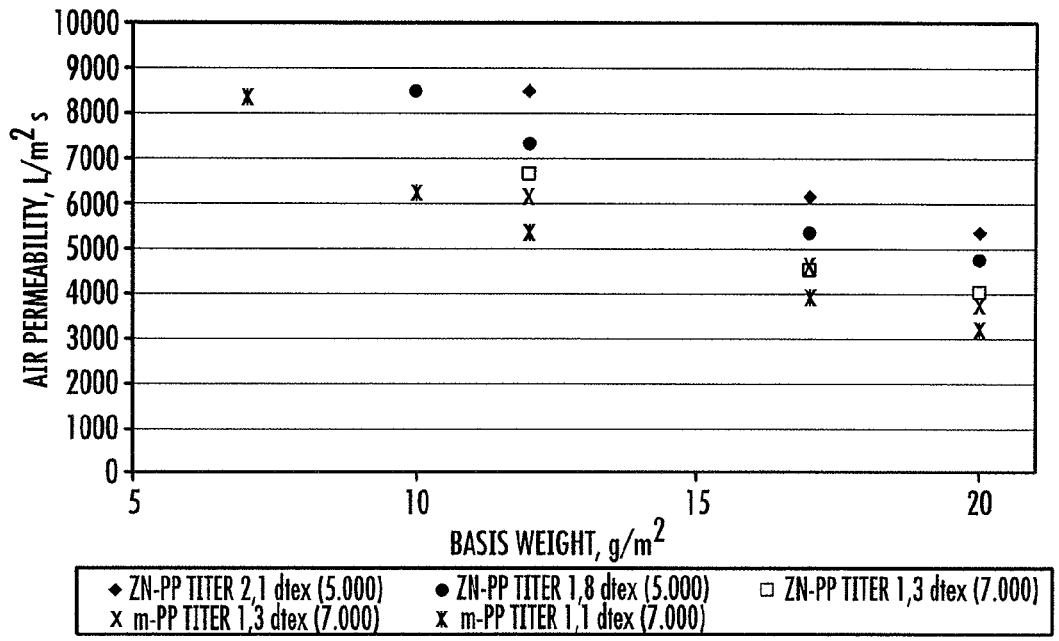
FIG. 5 shows the air permeability, measured on spun-bonded non-wovens with different basis weights.

According to FIG. 5, a significant change in air permeability of the spun-bonded non-woven follows from the change in spun-bonded non-woven density, shown in conjunction with FIG. 2. By means of the data depicted in FIG. 5 for air permeability, the effects of the two employed spinning devices are explained for the spun-bonded non-wovens produced with them. Thus, for the lightweight spun-bonded non-wovens, which were produced using a spinning device with an increased number of nozzle openings per surface of the spinning plate (7,000 nozzle openings per meter; width of the spinning package surface provided with nozzle openings 150 mm), considered in an absolute sense, significantly lower air permeabilities are measured than for the spun-bonded non-wovens produced using a spinning device with 5,000 nozzle openings per meter; width of the spinning plate surface provided with nozzle openings 150 mm.

However, it is conspicuous that spun-bonded non-wovens with a basis weight of 12 g/m² (sample 21: spun-bonded non-woven density 0.071 g/cm³, m-PP filament titer 1.1 dtex, spinning plate with 7,000 nozzle openings per meter), 17 g/m² (sample 6: density 0.068 g/cm³, ZN-PP filament titer 1.8 dtex, spinning plate with 5,000 nozzle openings per meter), as well as 20 g/m² (sample 1: density 0.068, ZN-PP filament titer 2.1 dtex, spinning plate with 5,000 nozzle openings per meter) had an air permeability of about 5,320 L/m² s, which is of a similar order of magnitude.

A spun-bonded non-woven with a basis weight of 7 g/m² and a density of 0.063 g/cm³ (sample 24), which was produced from m-PP (filament titer 1.1 dtex) with a varied spinning device with an increased number of nozzle openings per surface of the spinning plate (7,000 nozzle openings per meter) at 8,350 L/m² s also has roughly the same air permeability as a spun-bonded non-woven with a basis weight of 10 g/m² and a density of 0.058 g/cm³ (sample 8), which was produced from ZN-PP (filament titer 1.8 dtex) with a spinning plate with 5,000 nozzle openings per meter, or even a spun-bonded non-woven with a basis weight of 12 g/m² and a density of 0.056 g/cm³ (example 3), which was produced from ZN-PP (filament titer 2.1 dtex) with the usual spinning device with 5,000 nozzle openings per meter.

This means, as a result, that a non-woven produced from finer filament does have lower air permeability, because of higher density, but, at the same time, could be much lighter. In addition, it is conspicuous during precise consideration of the curve trend that the reduction of air permeability is not linear with increasing basis weight, i.e., with increasing basis weight, the air permeability differences become smaller between the ordinary and lightweight non-wovens.

Figure 6:
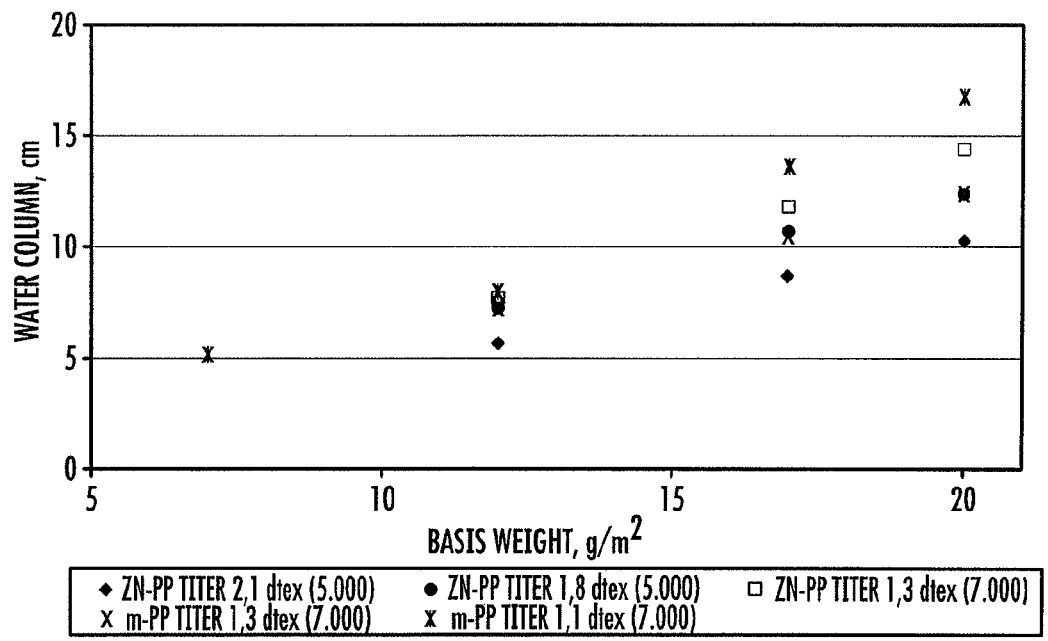
FIG. 6 shows the water column of spun-bonded non-wovens with different basis weights.

In FIG. 6 the water column is shown as a function of basis weight of the spun-bonded non-woven.

Figure 7:
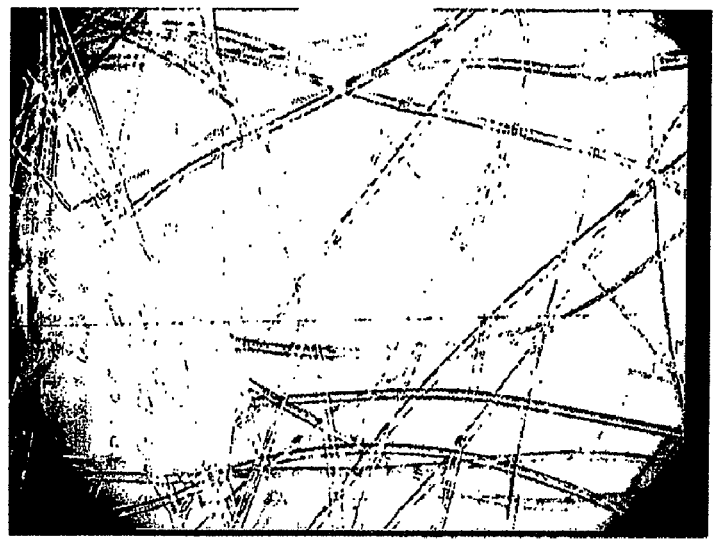
FIG. 7 shows light microscope images of lightweight spun-bonded non-wovens.
Figure 7:
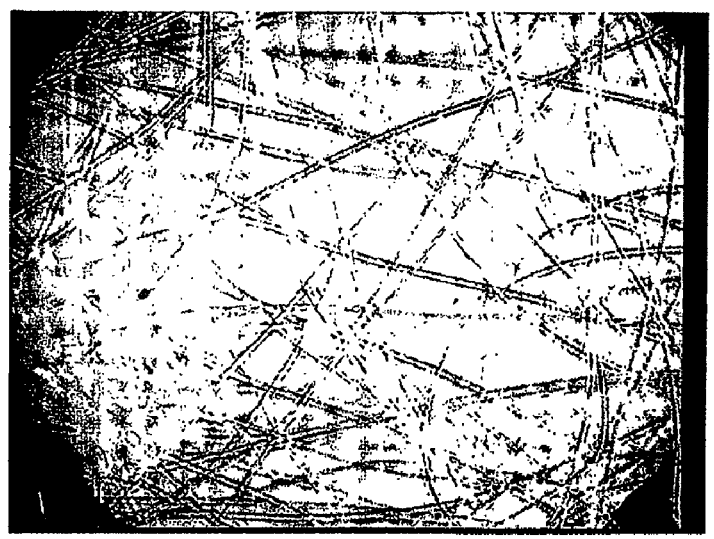

In FIG. 7, two light microscope images of two spun-bonded non-wovens with a basis weight of about 7 g/m² are shown. Sample 10 (see Table 1) has a basis weight of 7 g/m². The filaments produced from ZN-PP during use of a spinning device with 5,000 holes per meter of spinning plate have a titer of 1.8 dtex. The sample is shown at 10-fold magnification. Sample 24 (see Table 2) has a basis weight of 7 g/m². The filaments produced from m-PP, using a spinning device with 7,000 holes per meter of spinning plate, have a titer of only 1.1 dtex. The sample is shown at 10-times magnification. The images confirm the measurements of the spun-bonded non-woven density and sample 24 has the higher density.

In the lightweight spun-bonded non-wovens according to the invention, a best possible combination of mechanical properties and barrier properties was observed under the condition that
a) the filaments forming the spun-bonded non-wovens were spun using the altered spinning device with an increased number of nozzle openings per surface of the spinning plate,
b) the filament titer of the filaments forming the spun-bonded non-wovens is as low as possible, and
c) the spun-bonded non-wovens have increased spun-bonded non-woven density,
d) preferably m-PP is used to produce the spun-bonded non-wovens.

Methods

The following methods were used to determine the properties of the spun-bonded non-woven according to the invention:

Filament Titer/Basis Weight/Non-Woven Thickness/Spun-Bonded Non-Woven Density

Determination of the filament titer occurred by means of a microscope. Conversion of the measured filament titer (in micrometers) to decitex occurred according to the following formula (density PP=0.91 g/cm³):

$$\left(\frac{Titer_{\mu m}}{2}\right)^2 \cdot \pi \cdot \rho\left[\frac{g}{cm^3}\right] \cdot 0,01 = Titer_{dtex}\left[\frac{g}{10^4\,m}\right]$$

The basis weight determination of the spun-bonded non-wovens occurred according to DIN EN 29073-1 on test specimens measuring 10×10 cm.

The thickness of the spun-bonded non-wovens was measured as the distance between two plane-parallel measurement surfaces, between which the spun-bonded non-wovens are situated under a stipulated measurement pressure. The method was similar to that of DIN EN ISO 9073-2, in which a support weight of 125 g, measurement surface of 25 cm² and measurement pressure of 5 g/cm² were used.

The spun-bonded non-woven density is calculated from the basis weight and thickness of the spun-bonded non-woven.

Air Permeability

Measurement of air permeability of the spun-bonded non-wovens occurred according to DIN EN ISO 9237. The surface of the measurement head was 20 cm²; the applied test pressure was 200 Pa.

Water Column

Determination of the water column was carried out according to DIN EN 20811. The test pressure gradient was 10 mbar/min. As gauge of water-tightness, the water pressure is stated in mbar or cm water column, in which the water first emerges on the third site of the measurement sample.

Mechanical Properties

The mechanical properties of the spun-bonded non-wovens were determined according to DIN EN 29073-3. Tightening length: 100 mm, sample width 50 mm, advance 200 mm/min. "Maximum tensile force" is the maximum force reached during passage through the force-elongation curve. "Maximum tensile elongation" is the elongation in the force-elongation curve corresponding to maximum tensile force.

TABLE 1

|  |  | Smpl 1 | Smpl 2 | Smpl 3 | Smpl 4 | Smpl 5 | Smpl 6 | Smpl 7 |
|---|---|---|---|---|---|---|---|---|
| PP |  | ZN-PP | ZN-PP | ZN-PP | ZN-PP | ZN-PP | ZN-PP | ZN-PP |
| Spinning package |  |  |  |  |  |  |  |  |
| Nozzle openings (hole) per meter of spinning package |  | 5,000 | 5,000 | 5,000 | 5,000 | 5,000 | 5,000 | 5,000 |
| Process temperatures |  |  |  |  |  |  |  |  |
| Extruder first zone | °C. | 180 | 180 | 180 | 180 | 180 | 180 | 180 |
| Extruder head | °C. | 245 | 245 | 245 | 245 | 245 | 245 | 245 |
| Spinning package | °C. | 250 | 250 | 250 | 250 | 250 | 250 | 250 |
| Throughput | kg/h m | 185 | 185 | 185 | 185 | 135 | 135 | 135 |
| Calander oil temperature | °C. | 150 | 150 | 150 | 150 | 150 | 150 | 150 |
| Pressure in calander gap | N/mm | 70 | 70 | 70 | 70 | 70 | 70 | 70 |

TABLE 1-continued

|  |  | | | | | | | |
|---|---|---|---|---|---|---|---|---|
| Filament properties |  | | | | | | | |
| Titer | dtex | 2.1 | 2.2 | 2.1 | 2.1 | 1.8 | 1.7 | 1.8 |
|  | STD | 0.13 | 0.16 | 0.10 | 0.13 | 0.21 | 0.14 | 0.09 |
| Spun-bonded non-woven formation |  | | | | | | | |
| Basis weight | g/m$^2$ | 20 | 17 | 12 | 10 | 20 | 17 | 12 |
|  | STD | 0.98 | 0.74 | 0.50 | 0.52 | 0.93 | 1.11 | 0.44 |
| Non-woven thickness | μm | 296.0 | 264.0 | 210.5 | 179.0 | 274.5 | 249.5 | 195.5 |
|  | STD | 15.2 | 13.9 | 13.8 | 9.9 | 12.1 | 17.1 | 10.4 |
| Spun-bonded non-woven density | g/cm$^3$ | 0.068 | 0.064 | 0.056 | 0.056 | 0.073 | 0.068 | 0.060 |
| Barrier properties |  | | | | | | | |
| Air permeability | L/m$^2$·s | 5,325 | 6,120 | 8,477 | 9,612 | 4,740 | 5,349 | 7,347 |
|  | STD | 371.7 | 388.9 | 693.5 | 331.4 | 202.7 | 231.2 | 258.9 |
| Water column | cm | 10.2 | 8.6 | 5.6 | 4.5 | 12.3 | 10.65 | 7.3 |
|  | STD | 0.79 | 0.66 | 1.40 | 0.53 | 1.09 | 1.11 | 0.54 |
| Mechanical properties |  | | | | | | | |
| Max. tensile force MD | N/5 mm | 46.2 | 37.3 | 24.9 | 19.9 | 54.4 | 44.6 | 28.1 |
|  | STD | 2.63 | 2.08 | 2.93 | 1.80 | 1.62 | 2.75 | 2.89 |
| Max. tensile force CD | N/5 mm | 27.2 | 22.3 | 13.4 | 10.8 | 32.7 | 26.5 | 17.2 |
|  | STD | 2.09 | 1.40 | 1.77 | 1.42 | 2.41 | 2.44 | 2.27 |
| Max. tensile elongation MD | % | 62.3 | 58.4 | 52.5 | 46.6 | 72.8 | 67.7 | 57.6 |
|  | STD | 5.53 | 4.82 | 8.13 | 9.28 | 5.77 | 5.82 | 10.16 |
| Max. tensile elongation CD | % | 63.2 | 65.1 | 58.9 | 62.3 | 76.7 | 74.2 | 68.7 |
|  | STD | 5.31 | 5.03 | 9.39 | 8.29 | 3.33 | 8.34 | 7.32 |

|  |  | Smpl 8 | Smpl 9 | Smpl 10 | Smpl 11 | Smpl 12 | Smpl 13 | Smpl 14 |
|---|---|---|---|---|---|---|---|---|
| PP |  | ZN-PP | ZN-PP | ZN-PP | ZN-PP | ZN-PP | ZN-PP | ZN-PP |
| Spinning package |  | | | | | | | |
| Nozzle openings (hole) per meter of spinning package |  | 5,000 | 5,000 | 5,000 | 7,000 | 7,000 | 7,000 | 7,000 |
| Process temperatures |  | | | | | | | |
| Extruder first zone | °C. | 180 | 180 | 180 | 180 | 180 | 180 | 180 |
| Extruder head | °C. | 245 | 245 | 245 | 245 | 245 | 245 | 245 |
| Spinning package | °C. | 250 | 250 | 250 | 250 | 250 | 250 | 250 |
| Throughput | kg/h m | 135 | 135 | 135 | 185 | 185 | 185 | 185 |
| Calander oil temperature | °C. | 150 | 150 | 150 | 150 | 150 | 150 | 150 |
| Pressure in calander gap | N/mm | 70 | 70 | 70 | 70 | 70 | 70 | 70 |
| Filament properties |  | | | | | | | |
| Titer | dtex | 1.8 | 1.8 | 1.8 | 1.3 | 1.5 | 1.3 | 1.3 |
|  | STD | 0.08 | 0.13 | 0.09 | 0.10 | 0.08 | 0.13 | 0.13 |
| Spun-bonded non-woven formation |  | | | | | | | |
| Basis weight | g/m$^2$ | 10 | 8 | 7 | 20 | 17 | 12 | 10 |
|  | STD | 0.48 | 0.42 | 0.42 | 0.64 | 1.03 | 0.48 | 0.36 |
| Non-woven thickness | μm | 178.0 | 147.0 | 132.5 | 266.0 | 244.5 | 183.0 | 161.5 |
|  | STD | 10.3 | 7.1 | 10.6 | 9.1 | 10.7 | 8.9 | 7.1 |
| Spun-bonded non-woven density | g/cm$^3$ | 0.058 | 0.054 | 0.055 | 0.075 | 0.069 | 0.064 | 0.062 |
| Barrier properties |  | | | | | | | |
| Air permeability | L/m$^2$·s | 8,491 | 10,229 | 11,440 | 4,013 | 4,543 | 6,678 | 7,550 |
|  | STD | 456.0 | 463.9 | 801.7 | 263.5 | 331.7 | 439.3 | 448.3 |
| Water column | cm | 6.3 | 4.9 | 4.0 | 14.3 | 11.7 | 7.8 | 6.8 |
|  | STD | 0.63 | 0.99 | 0.75 | 0.89 | 0.59 | 1.16 | 1.36 |
| Mechanical properties |  | | | | | | | |
| Max. tensile force MD | N/5 mm | 22.9 | 17.2 | 15.2 | 58.6 | 51.0 | 31.5 | 26.2 |
|  | STD | 1.45 | 1.17 | 1.26 | 2.80 | 2.99 | 2.83 | 2.76 |
| Max. tensile force CD | N/5 mm | 13.3 | 9.5 | 8.1 | 31.6 | 25.5 | 17.6 | 12.9 |
|  | STD | 0.99 | 1.22 | 1.10 | 1.47 | 2.05 | 1.74 | 1.60 |
| Max. tensile elongation MD | % | 52.8 | 45.3 | 47.2 | 71.1 | 72.0 | 61.9 | 57.5 |
|  | STD | 6.77 | 5.03 | 5.67 | 5.64 | 6.18 | 8.80 | 11.71 |
| Max. tensile elongation CD | % | 63.2 | 58.5 | 62.1 | 78.2 | 72.9 | 74.4 | 72.0 |
|  | STD | 5.47 | 11.43 | 11.52 | 5.34 | 6.85 | 7.17 | 12.28 |

TABLE 2

| | | Smpl 15 | Smpl 16 | Smpl 17 | Smpl 18 | Smpl 19 | Smpl 20 |
|---|---|---|---|---|---|---|---|
| PP | | m-PP | m-PP | m-PP | m-PP | m-PP | m-PP |
| Spinning package | | | | | | | |
| Nozzle openings (hole) per meter of spinning package | | 7,000 | 7,000 | 7,000 | 7,000 | 7,000 | 7,000 |
| Process temperatures | | | | | | | |
| Extruder first zone | °C. | 180 | 180 | 180 | 180 | 180 | 180 |
| Extruder head | °C. | 245 | 245 | 245 | 245 | 245 | 245 |
| Spinning package | °C. | 250 | 250 | 250 | 250 | 250 | 250 |
| Throughput | kg/h m | 185 | 185 | 185 | 185 | 135 | 135 |
| Calander oil temperature | °C. | 150 | 150 | 150 | 150 | 150 | 150 |
| Pressure in calander gap | N/mm | 70 | 70 | 70 | 70 | 70 | 70 |
| Filament properties | | | | | | | |
| Titer | dtex | 1.3 | 1.3 | 1.3 | 1.3 | 1.1 | 1.1 |
| | STD | 0.12 | 0.15 | 0.12 | 0.11 | 0.00 | 0.00 |
| Spun-bonded non-woven formation | | | | | | | |
| Basis weight | g/m$^2$ | 20 | 17 | 12 | 10 | 20 | 17 |
| | STD | 0.55 | 0.89 | 0.47 | 0.46 | 0.64 | 0.67 |
| Non-woven thickness | μm | 250.5 | 222.5 | 174.0 | 155.5 | 242.5 | 218.5 |
| | STD | 9.0 | 18.3 | 9.7 | 8.0 | 7.9 | 9.4 |
| spun-bonded non-woven density | g/cm$^3$ | 0.079 | 0.076 | 0.068 | 0.065 | 0.083 | 0.078 |
| Barrier properties | | | | | | | |
| Air permeability | L/m$^2$·s | 3,736 | 4,630 | 6,109 | 7,313 | 3,194 | 3,889 |
| | STD | 285.0 | 437.1 | 373.8 | 604.6 | 182.1 | 140.0 |
| Water column | cm | 12.35 | 10.3 | 7.2 | 5.7 | 16.7 | 13.55 |
| | STD | 1.75 | 0.98 | 0.89 | 0.75 | 1.09 | 1.01 |
| Mechanical properties | | | | | | | |
| Max. tensile force MD | N/5 mm | 47.6 | 36.0 | 20.2 | 17.1 | 61.5 | 46.1 |
| | STD | 5.91 | 6.54 | 3.15 | 1.70 | 6.54 | 4.21 |
| Max. tensile force CD | N/5 mm | 23.1 | 19.1 | 11.1 | 8.7 | 31.5 | 24.1 |
| | STD | 5.29 | 1.97 | 2.58 | 1.38 | 2.67 | 3.56 |
| Max. tensile elongation MD | % | 45.0 | 36.3 | 29.9 | 28.7 | 48.1 | 42.1 |
| | STD | 6.90 | 7.05 | 5.60 | 4.01 | 6.07 | 3.41 |
| Max. tensile elongation CD | % | 48.0 | 49.2 | 43.4 | 42.6 | 57.7 | 52.9 |
| | STD | 11.73 | 5.13 | 10.54 | 6.19 | 5.22 | 8.91 |
| | | Smpl 21 | Smpl 22 | Smpl 23 | Smpl 24 | Smpl 25 1$^{st}$ layer | Smpl 25 2$^{nd}$ layer |
| PP | | m-PP | m-PP | m-PP | m-PP | ZN-PP | m-PP |
| Spinning package | | | | | | | |
| Nozzle openings (hole) per meter of spinning package | | 7,000 | 7,000 | 7,000 | 7,000 | 5,000 | 7,000 |
| Process temperatures | | | | | | | |
| Extruder first zone | °C. | 180 | 180 | 180 | 180 | 180 | 180 |
| Extruder head | °C. | 245 | 245 | 245 | 245 | 230 | 235 |
| Spinning package | °C. | 250 | 250 | 250 | 250 | 240 | 240 |
| Throughput | kg/h m | 135 | 135 | 135 | 135 | 185 | 185 |
| Calander oil temperature | °C. | 150 | 150 | 150 | 150 | 148 | 148 |
| Pressure in calander gap | N/mm | 70 | 70 | 70 | 70 | 85 | 85 |
| Filament properties | | | | | | | |
| Titer | dtex | 1.1 | 1.1 | 1.1 | 1.0 | 2.0 | 1.4 |
| | STD | 0.00 | 0.00 | 0.00 | 0.08 | 0.39 | 0.13 |
| Spun-bonded non-woven formation | | | | | | | |
| Basis weight | g/m$^2$ | 12 | 10 | 8 | 7 | 10 | |
| | STD | 0.52 | 0.46 | 0.30 | 0.31 | 0.36 | |
| Non-woven thickness | μm | 170.5 | 148.5 | 128.5 | 115.5 | 173 | |
| | STD | 8.0 | 9.1 | 5.8 | 5.5 | 20.4 | |
| spun-bonded non-woven density | g/cm$^3$ | 0.071 | 0.068 | 0.062 | 0.063 | 0.061 | |
| Barrier properties | | | | | | | |
| Air permeability | L/m$^2$·s | 5,319 | 6,200 | 7,632 | 8,346 | 7,907 | |
| | STD | 296.2 | 370.7 | 451.2 | 454.5 | 517.1 | |
| Water column | cm | 8.1 | 7.3 | 6.4 | 5.2 | — | |
| | STD | 1.17 | 1.36 | 0.97 | 0.71 | — | |

TABLE 2-continued

| Mechanical properties | | | | | | |
|---|---|---|---|---|---|---|
| Max. tensile force MD | N/5 mm | 24.0 | 18.1 | 12.5 | 9.8 | 21.1 |
| | STD | 2.62 | 3.04 | 1.54 | 1.56 | 2.84 |
| Max. tensile force CD | N/5 mm | 12.1 | 9.5 | 5.6 | 4.7 | 7.3 |
| | STD | 1.33 | 1.97 | 0.75 | 0.70 | 1.24 |
| Max. tensile elongation MD | % | 27.9 | 23.2 | 18.4 | 17.2 | 42.6 |
| | STD | 3.47 | 5.28 | 3.64 | 4.12 | 6.12 |
| Max. tensile elongation CD | % | 42.2 | 38.4 | 32.9 | 34.0 | 53.5 |
| | STD | 6.20 | 4.98 | 4.64 | 5.38 | 8.00 |

What is claimed:

1. A Spun-bonded non-woven comprising: polyolefin filaments with a filament titer of <1.6 dtex, the spun-bonded non-woven having
   a basis weight of less than 12 g/m$^2$,
   a density of $\geq$0.06 g/cm$^3$, and
   a maximum tensile force
   from 10 to 32 N in the machine direction, and
   from 5 to 20 N across the machine direction, and
   wherein the polyolefin filaments contain a filler or a pigment.

2. Spun-bonded non-woven according to claim 1, wherein the spun-bonded non-woven has a density in the range of 0.06 to 0.084 g/cm$^3$.

3. Spun-bonded non-woven according to claim 2, wherein the spun-bonded non-woven, at densities from 0.06 to 0.084 g/cm$^3$, has air permeabilities from 3,100 to 8,400 L/m$^2$ s, and a water column of 5 to 17 cm.

4. Spun-bonded non-woven according to claim 1, wherein the spun-bonded non-woven has a basis weight from 4 to less than 12 g/m$^2$, and a density in the range of 0.06 to 0.073 g/cm$^3$.

5. Spun-bonded non-woven according to claim 4, wherein the spun-bonded non-woven has air permeabilities between 3,900 and 8,350 L/(m$^2$*s), and a water column between 7 and 11 cm.

6. Spun-bonded non-woven according to claim 4, wherein the spun-bonded non-woven has a density from 0.06 to 0.073 g/cm$^3$.

7. Spun-bonded non-woven according to claim 4, wherein the spun-bonded non-woven has a maximum tensile elongation from 20 to 75% in the machine direction, and from 20 to 75% across the machine direction.

8. Spun-bonded non-woven according to claim 1, wherein the filaments have a filament titer in the range from 1 to 1.3 dtex.

9. Spun-bonded non-woven according to claim 1, wherein the spun-bonded non-woven is compacted and has a basis weight of about 7 to less than 12 g/m$^2$.

10. Spun-bonded non-woven according to claim 1, wherein the non-woven thickness is about 115 to about 296 μm.

11. Spun-bonded non-woven according to claim 1, wherein the polyolefin filament consists of polypropylene or polyethylene or a mixture of both.

12. Spun-bonded non-woven according to claim 11, wherein the polyolefin filaments consist of an olefin copolymer.

13. Spun-bonded non-woven according to claim 1, wherein the polyolefin filaments consist of a polyolefin produced by metallocene catalysis.

14. Spun-bonded non-woven according to claim 1, wherein the polyolefin filaments consist of a polypropylene (m-polypropylene) produced by metallocene catalysis.

15. Spun-bonded non-woven according to claim 1, wherein the filler is calcium carbonate and the filler content, referred to the polymer filament, has a filler content of >5 wt. %.

16. Spun-bonded non-woven according to claim 1, wherein a top cut of the filler particles is <10 μm and an average particle size of the filler is preferably about 2 to about 6 μm.

17. Spun-bonded non-woven according to claim 1, wherein the filaments produced in the melt spinning method and laid to a non-woven are compacted thermally and/or chemically.

18. Laminate constructed from at least two spun-bonded non-woven layers, in which at least one layer consists of the lightweight spun-bonded non-woven according to claim 1.

19. An article produced from a spun-bonded nonwoven according to claim 1, said article being selected from the group consisting of diapers, sanitary napkins, cosmetic pads, dust cloths, wiping cloths, wiping mop cloths, filters for gases, aerosols and liquids, bandages, compresses, insulation materials, acoustic non-wovens, insert materials, microperforated roof insulation sheeting, geofabrics, or covers for field crops and vegetables.

* * * * *